US008272260B2

(12) United States Patent
Jackson et al.

(10) Patent No.: US 8,272,260 B2
(45) Date of Patent: Sep. 25, 2012

(54) METHOD AND APPARATUS FOR FORMATION EVALUATION AFTER DRILLING

(75) Inventors: Charles R. Jackson, The Woodlands, TX (US); Robert K. Moore, Orange Beach, AL (US)

(73) Assignee: Baker Hughes Incorporated, Houston, TX (US)

( * ) Notice: Subject to any disclaimer, the term of this patent is extended or adjusted under 35 U.S.C. 154(b) by 212 days.

(21) Appl. No.: 12/212,777

(22) Filed: Sep. 18, 2008

(65) Prior Publication Data

US 2010/0064794 A1 Mar. 18, 2010

(51) Int. Cl.
*E21B 49/00* (2006.01)
(52) U.S. Cl. .................................... 73/152.02
(58) Field of Classification Search ............... 73/152.02; 166/66
See application file for complete search history.

(56) References Cited

U.S. PATENT DOCUMENTS

| 4,541,481 A * | 9/1985 | Lancaster ................... 340/856.2 |
| 5,495,755 A * | 3/1996 | Moore ........................ 73/152.02 |
| 5,597,042 A | 1/1997 | Tubel et al. ............... 166/250.01 |
| 5,662,165 A | 9/1997 | Tubel et al. ............... 166/250.01 |
| 5,730,219 A | 3/1998 | Tubel et al. ................. 166/250.1 |
| 6,092,416 A | 7/2000 | Halford et al. ............. 73/152.23 |
| 7,303,022 B2 * | 12/2007 | Tilton et al. .................... 166/380 |
| 7,546,885 B2 | 6/2009 | Longfield ........................ 175/50 |
| 2003/0234120 A1 * | 12/2003 | Paluch et al. ..................... 175/50 |
| 2004/0216873 A1 | 11/2004 | Frost, Jr. et al. .......... 166/250.01 |
| 2005/0028974 A1 * | 2/2005 | Moody .......................... 166/264 |
| 2008/0066536 A1 * | 3/2008 | Goodwin et al. ........... 73/152.24 |
| 2010/0328096 A1 * | 12/2010 | Hache et al. ................ 340/854.4 |

FOREIGN PATENT DOCUMENTS

EP 417369 A1 * 3/1991

* cited by examiner

*Primary Examiner* — Peter Macchiarolo
*Assistant Examiner* — Tamiko Bellamy
(74) *Attorney, Agent, or Firm* — Cantor Colburn LLP

(57) ABSTRACT

Methods and apparatus for evaluating a formation include conveying a formation evaluation tool in a borehole on a tubular carrier extending from a surface location at least to the formation evaluation tool. A cable is conveyed to the formation evaluation tool and communication between the formation evaluation tool and the cable is established after the formation evaluation tool is moved to a selected borehole location.

20 Claims, 5 Drawing Sheets

METHOD AND APPARATUS FOR FORMATION EVALUATION AFTER DRILLING

BACKGROUND

1. Technical Field

The present disclosure generally relates to formation evaluation and in particular to methods and apparatus for formation evaluation after drilling.

2. Background Information

Oil and gas wells have been drilled at depths ranging from a few thousand feet to as deep as 5 miles. Wireline and drilling tools often incorporate various sensors, instruments and control devices in order to carry out any number of downhole operations. These operations may include formation testing and monitoring and tool monitoring and control.

Typical well development includes a primary drilling system that drills the well through one or more producing formations to a total depth ("TD"). Formation evaluation tools used in a while-drilling arrangement provide some information relating to the traversed formations, but relatively slow transmission methods during drilling result limitations on the information available in real time. As a result, the knowledge gained from while-drilling tools provides at best a rough estimate as to the content and production ability of the formations. Furthermore, the primary drilling operation is extremely harsh on sensitive test instruments and protecting some of the more sensitive instruments from the shock and vibration environment experienced during primary drilling is expensive and sometimes limited by the space requirements in the drill string. Completion operations and the design of production processing facilities at the well head require information about the producing formations that is more precise and complete than provided by current while-drilling formation evaluation tools.

Wireline systems are sometimes used after primary drilling operations are complete at least through a suspected producing zone or zone of interest to gather more information about the zone of interest in order to better design the completion operations and surface processing facilities. The drill string is tripped and the wireline is run into the well to the zone of interest. The wireline tool provides a communication cable to the surface that provides information transmission rates higher than mud pulse telemetry and other while-drilling transmission methods. Wireline systems, however, cannot be conveyed into ultra-deep wells (up to 30,000 feet and more) without running the risk of losing the tool in the borehole due to strength limitations of the supporting cable. A broken wireline cable and lost tool may cost millions of dollars in lost time, lost equipment and the cost of drilling a bypass borehole.

Pipe-conveyed logging ("PCL") tools are sometimes used to convey a formation evaluation tool in wells too deep for conventional wireline tools. A PCL tool includes a cable like a wireline tool, but the weight of the PCL tool is supported by a pipe allowing deeper penetration. Using a pipe also provides the ability to push the PCL tool in boreholes deviated from vertical. These PCL tools suffer in that the sensitive instruments can be damaged or destroyed if the operator pushes the pipe too hard through a well borehole zone that is of poor dimensional quality. Therefore, the PCL tool is typically lowered or pushed very slowly, which is a time cost. Even when the pipe is lowered slowly, an obstruction may still exist in the pre-drilled borehole. The operator must choose between tripping the PCL tool and increasing the weight on the pipe to force the pipe through the obstruction. There is a risk that the PCL tool becomes stuck in the borehole or even broken off due to the attempted forcing. This results in the need to drill a bypass borehole, which may cost the drilling operations millions of dollars in lost time and equipment.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

Disclosed is a method for evaluating a formation. The method includes conveying a formation evaluation tool in a borehole on a tubular carrier extending from a surface location at least to the formation evaluation tool. A cable is conveyed to the formation evaluation tool. Communication between the formation evaluation tool and the cable is established after the formation evaluation tool is moved to a selected borehole location and the formation evaluation tool is operated in-situ.

Another aspect disclosed is an apparatus for evaluating a formation that includes a tubular carrier, and a formation evaluation tool is coupled to the carrier. The carrier extends from a surface location at least to the formation evaluation tool, and an interface establishes communication between the formation evaluation tool and a cable after the formation evaluation tool is moved to a selected borehole location.

BRIEF DESCRIPTION OF THE DRAWINGS

For a detailed understanding of the present disclosure, reference should be made to the following detailed description of the several non-limiting embodiments, taken in conjunction with the accompanying drawings, in which like elements have been given like numerals and wherein.

DESCRIPTION OF EXEMPLARY EMBODIMENTS

Figure 1:
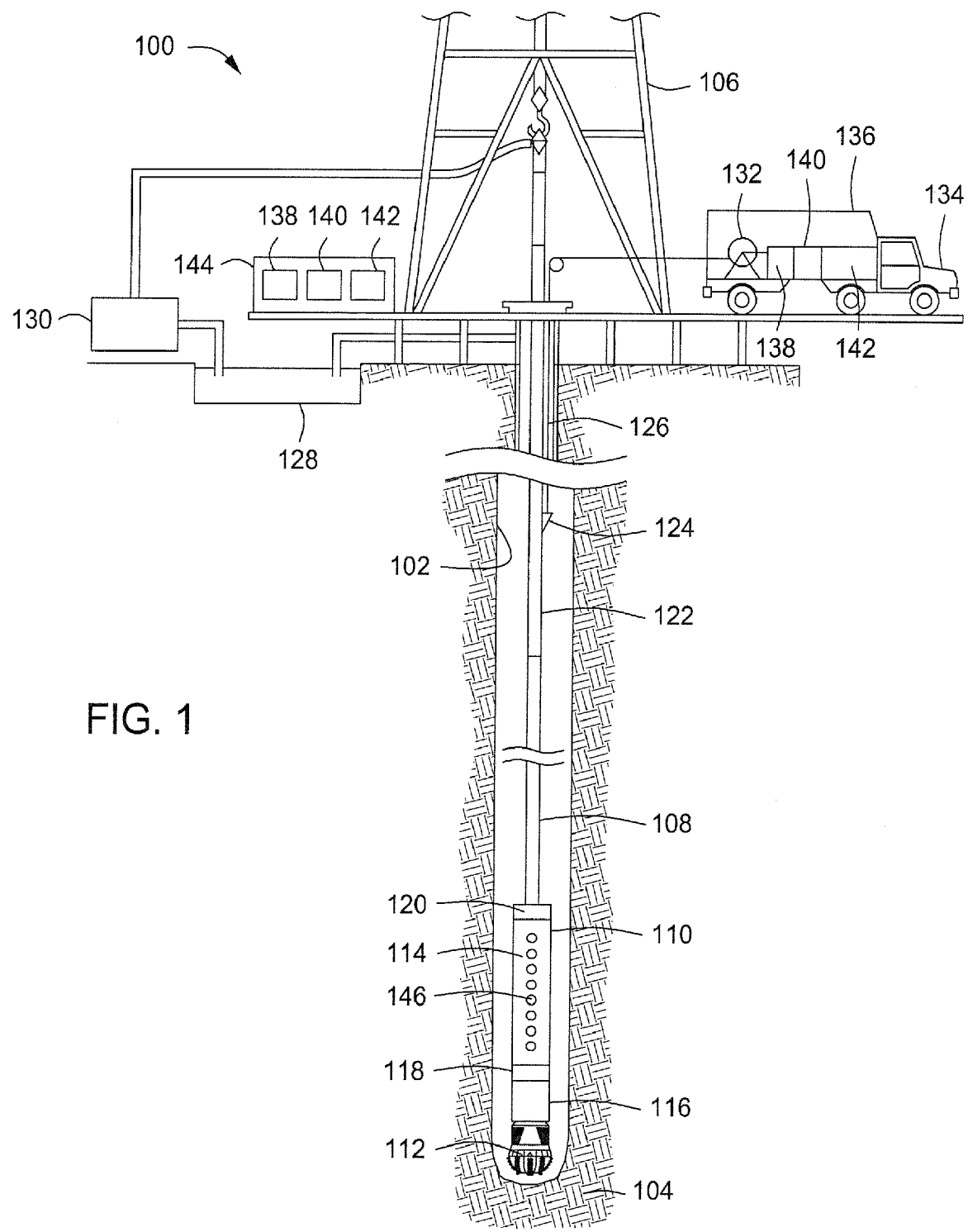
FIG. 1 illustrates a non-limiting example of a measurement-after-drilling system according to the disclosure.

FIG. 1 schematically illustrates a non-limiting example of a formation evaluation ("FE") system 100 in a measurement-after-drilling ("MAD") arrangement according to several non-limiting embodiments of the disclosure. The FE system 100 is shown disposed in a well borehole 102 penetrating earth formations 104. The borehole 102 can be filled with a fluid having a density sufficient to prevent formation fluid influx. In one or more embodiments, the borehole 102 may be a reinforced borehole. For example, the borehole 102 can be reinforced with cement, a casing, or both. Reinforcing the borehole 102 can support the borehole and prevent formation fluid influx into the borehole 102.

A derrick 106 may be used to support a first carrier or ("drill string") 108, which may be a coiled tube or drill pipe. The drill string 108 may carry a downhole sub 110 and a drill bit 112 at a distal end of the drill string 108. In several non-limiting examples, the drill bit 112 may be used for cleaning or reaming a borehole 102, which has been drilled to total depth ("TD") by a primary drilling system not shown in this example. A drill motor 116 is shown disposed below the downhole sub 110. In one or more embodiments, the motor 116 may include a mud motor having a torque less than a primary drilling system mud motor. A higher torque primary motor is not necessary where only cleaning the predrilled borehole is desired. However, those skilled in the art with the benefit of the present disclosure will recognize that a primary drill motor may be used without departing from the scope of the disclosure.

The downhole sub 110 includes a formation evaluation ("FE") tool 114. As used herein, an FE tool 114 may include a sampling tool, a measurement tool or a combination thereof. Exemplary sampling tools include core sample tools, fluid sample tools or a combination of core and fluid sampling tools. Measurement tools may include pressure measurement tools, gamma ray positioning tools, temperature measurement tools, neutron detectors, spectrometers, chemical analysis tools, nuclear magnetic resonance (NMR) tools, acoustic tools, resistivity tools, dielectric measurement tools, or any combination of these and other tools.

The FE system 100 also includes a second carrier or ("slickline") 126 that may be run into the borehole 102. The drill string 108 may include a side entry sub 122 having a port 124 for receiving the slickline 126 at a selected position along the drill string 108. As illustrated the slickline 126 can be spooled and unspooled from a winch or drum 132. The winch or drum 132 may be disposed on a truck 134.

The exemplary downhole sub 110 disposed on the drill string 108 and the slickline 126 operate as carriers, but any carrier is considered within the scope of the disclosure. The term "carrier" as used herein means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof. Other carrier examples include casing pipes, wirelines, wireline sondes, slicklines, slickline sondes, drop shots, downhole subs, BHAs, drill string inserts, modules, internal housings and substrate portions thereof.

The downhole sub 110 may be configured to convey information signals to a first set of surface equipment 136 by the slickline 126. As will be described in more detail later with reference to FIG. 2, a wet connect 120 may be used to establish communication between the slickline 126 and the downhole sub 110 after the downhole sub 110 has been positioned at a selected location in the borehole 102. The surface equipment 136 can include one part of a telemetry system 138 for communicating control signals and data signals to the downhole sub 110 and may further include a computer 140. The surface equipment 136 can also include a data recorder 142 for recording measurements acquired by the downhole sub 110 and transmitted to the surface equipment 118.

The system 100 may be configured to convey information signals to a second set of surface equipment 144 that may be substantially similar to the first set of surface equipment 136. In several non-limiting embodiments the first set of surface equipment 136 and the second set of surface equipment 144 may be a single set of surface equipment. In other non-limiting embodiments the first set of surface equipment 136 and the second set of surface equipment 144 may be combined within a single unit or housing.

In operation, the drill string 108 may be run in the borehole 102 after the borehole has been drilled with a primary drilling system. Positioning devices 118, such as a gamma ray positioning device, accelerometers, magnetometers or the like disposed within or near the downhole sub 110 are used to position the downhole sub 110 at a selected borehole location and orientation. The slickline 126 may be fed into the borehole 102 and then into the drill string 108 via the side entry sub 122. The slickline 126 may be pumped through the drill string 108 using drilling fluid or "mud" from a mud pit 128 and a circulation system 130 to move the slickline through an inner bore or ("drilling fluid flow line") of the drill string 108. The mud exits at the drill bit 112 and returns to the surface through an annular space between the drill string 108 and inner wall of the borehole 102. The pressurized drilling fluid may further be used to drive the motor 116 and may provide lubrication to various elements of the drill string 108 and/or the slickline 126.

Those skilled in the art will recognize that a pre-drilled borehole may have one or more zones with poor quality dimensions that will hinder a wireline or pipe-conveyed logging (PCL) system. An operator will recognize entry into one of these zones by a weight-on-bit ("WOB") indicator that exceeds a specified value. Using one or more of the disclosed embodiments, the operator may activate the mud motor 116 using mud pulse telemetry and the second set of surface equipment 144 to begin rotating the bit 112 in the affected zone. Rotating the bit 112 in the affected zone will clean the borehole, thereby making running the sub 110 through the borehole much easier and will greatly reduce the risk of damaging the FE tool 114 carried by the drill string 108. In one or more embodiments, the drill bit may be a rotary cutting bit, a reaming bit, a roller bit or any other suitable bit for cleaning the borehole ahead of the FE tool 114. In one or more embodiments, the motor 116 and bit 112 may be operated substantially in a continuous manner while the FE tool 114 is being run in the borehole 102.

Once the FE tool 114 is positioned, the slickline 126 may be run through the drill string and communication may be established via the wet connect device 120 coupled to the downhole sub 110. The FE tool 114 may then be operated under control by the surface equipment 136 to collect information and/or samples at the selected downhole location. Those skilled in the art with the benefit of the present disclosure will appreciate that any of several FE tools or combinations of FE tools may be included. The FE tool illustrated in the non-limiting example of FIG. 1 includes one or more ballistic coring devices 146, which will be described further with reference to FIG. 2.

Figure 2:
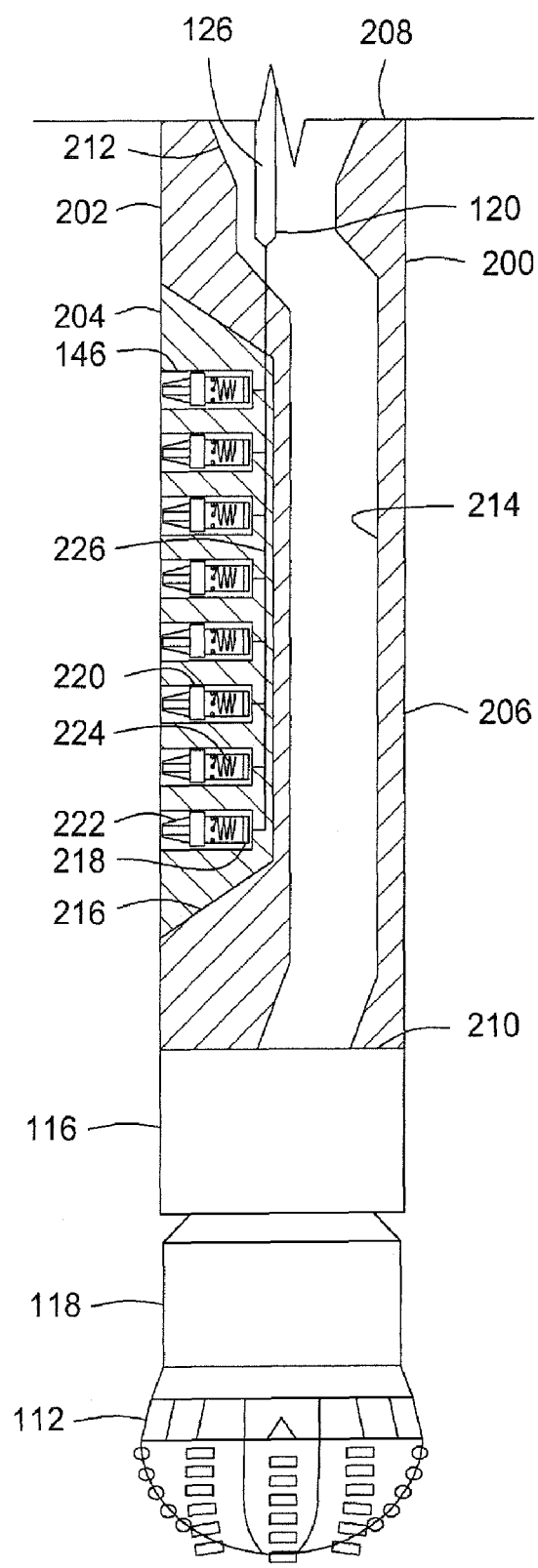
FIG. 2 illustrates a partial cross-sectional view of a downhole sub according to the disclosure that includes a ballistic sidewall coring tool.

FIG. 2 illustrates a partial cross-sectional view of a downhole sub 200 according to the disclosure that includes an FE tool 202 that includes a ballistic sidewall coring tool 204. The downhole sub 200 may be substantially similar to the downhole sub 110 described above and shown in FIG. 1. The downhole sub 200 includes an elongated section 206 having a first end 208 and a second end 210. The first end 208 includes a coupling 212 suitable for connecting the sub 200 to a drill string 108 as described above and shown in FIG. 1. A fluid passage 214 extends through the downhole sub 200 and is routed to bypass the FE tool 202. The passage 214 may then exit the downhole sub second end 210 at a connection 216 that establishes fluidic communication with a motor 116 and bit 112 substantially as described above and shown in FIG. 1.

The ballistic coring tool 204 may include several individual coring devices 146. Each coring device 146 may include an explosive charge section 218 and a releasable bullet 220. The releasable bullet 220 includes an inner passage 222 that cuts a core sample when the bullet 220 is shot into a sidewall of the borehole. A tether 224 connects the bullet 220 to the tool 204. The tether 224 may be a stranded fiber or stranded metal tether such as a stainless steel tether that has a tensile strength sufficient to pull the bullet from the formation. After firing, the tether 224 may be used to extract the bullet 220 and core sample from the sidewall by lifting the drill string 108 from the borehole.

Each coring device 146 may be electrically connected to a surface controller by electrical conductors 226 that are connected to the slickline 126. The slickline 126 is connected to the FE tool 202 via a wet connector 120 suitable for establishing an electrical connection after the slickline is pumped down to the FE tool 202.

Figure 3:
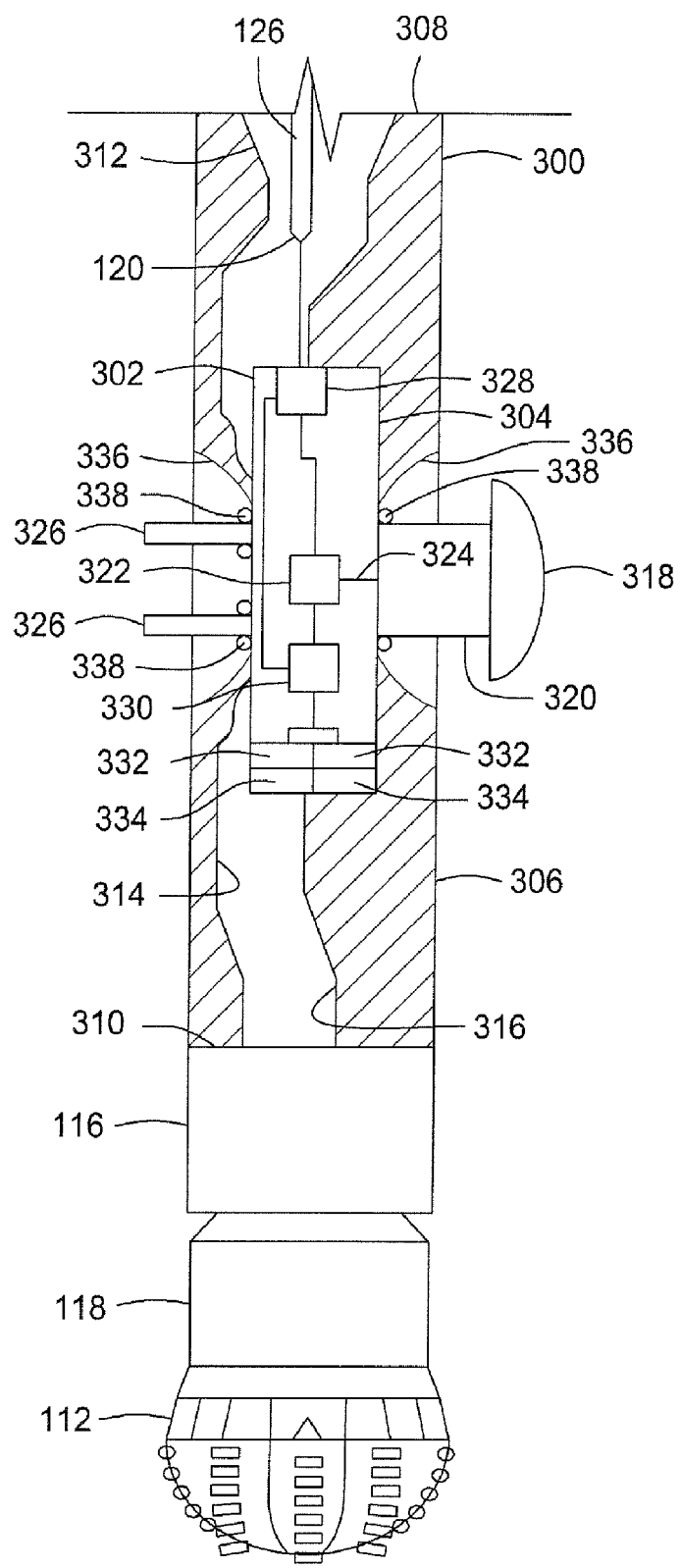
FIG. 3 illustrates another partial cross-sectional view of a downhole sub according to the disclosure that includes a fluid sampling tool.

FIG. 3 illustrates another partial cross-sectional view of a downhole sub 300 according to the disclosure that includes a FE tool 302 incorporating a fluid sampling tool 304. The fluid sample tool 304 in one or more embodiments may be used to sample fluid from the formation surrounding the borehole. The downhole sub 300 in this non-limiting example includes an elongated section 306 having a first end 308 and a second end 310. The first end 308 includes a coupling 312 suitable for connecting the sub 300 to a drill string 108 as described above and shown in FIG. 1. A fluid passage 314 extends through the downhole sub 300 and is routed to bypass the FE tool 302. The passage 314 may then exit the downhole sub second end 310 at a connection 316 that establishes fluidic communication with a motor 116 and bit 112 substantially as described above and shown in FIG. 1.

In one or more embodiments, the fluid sampling tool 304 may include an elastomeric pad 318 mounted on an extendable probe 320. The extendable probe 320 may be in fluid communication with a fluid mover 322 such as a piston within the extendable probe 320, a fluid pump or a combination thereof via a flowline 324. In some embodiments, one or more back-up feet 326 or a backup shoe may be provided to extend to a borehole wall portion substantially opposite the area engaged by the pad 318. Construction and operational details of a suitable non-limiting fluid sample tool 304 for extracting fluids are more described by U.S. Pat. No. 5,303,775, the specification of which is incorporated herein by reference. The exemplary sub 300 may include a recess 336 into which the probe 320 and pad 318 may be retracted during transport in the borehole. O-ring seals 338 may be provided to provide a fluid barrier between internal portions of the tool 302 and the borehole. A similar recess 336 and O-ring seals 338 may be provided for the back-up feet 326 when used.

A controller 328 may be included to control operation of the extendable probe 320, the back-up feet 326 and the fluid mover 322. One or more positioning devices 118 may be disposed in a suitable location to provide precise positioning and orientation of the sub 300 and FE tool 302 for MAD operations. A fluid analyzer 330 may be included to analyze fluid samples entering the tool 302. In one or more embodiments, the fluid analyzer may include a spectrometer, a resistivity tool, a dielectric tool, a neutron detector, a gas chromatograph or a combination thereof.

In one or more non-limiting embodiments, a sample container 332 may be disposed in the FE tool 302 to collect fluid samples for further testing at a surface laboratory. Although two sample containers are shown, a single container or more than two containers may be included without departing from the scope of the disclosure. A compensator 334 may be incorporated with each sample container 332. A compensator 334 may include any number of devices for maintaining the sample at a pressure and temperature sufficient to avoid precipitates while the fluid sample is removed from the borehole. Several examples of suitable sampling chamber configurations capable of maintaining sample pressure are described in U.S. Pat. Nos. 5,303,775 and 5,377,755 for "Method and Apparatus for Acquiring and Processing Subsurface Samples of Connate Fluid," which patents are assigned to the assignee of the present application and incorporated herein in their entireties by reference.

In one or more non-limiting operational embodiments, the FE tool 302 is conveyed on the downhole sub 300 after a primary drilling system has drilled a borehole through a zone of interest. The drilling motor 116 may be operated to rotate the drill bit 112 when the drill string encounters an obstruction of otherwise poor quality borehole zone.

The positioning devices 118 are operated to position and orient the FE tool 302 at a selected position in the borehole. A slickline 126 is conveyed in the borehole to a side-entry sub 122 at which point the slickline enters the drill string 108 and is pumped down the drill string using surface equipment as discussed above and shown in FIG. 1.

The slickline 126 includes a wet connect connector 120 that engages a corresponding wet connect connector mounted on the downhole sub to establish communication with the FE tool 302 after the FE tool is positioned. The FE tool 302 may then be operated under control by the surface equipment 136 to collect information and/or samples at the selected downhole location. The slickline 126 provides high bandwidth data communication between the surface equipment and the tool, and the high bandwidth enables more information and commands to be transmitted.

Figure 4:
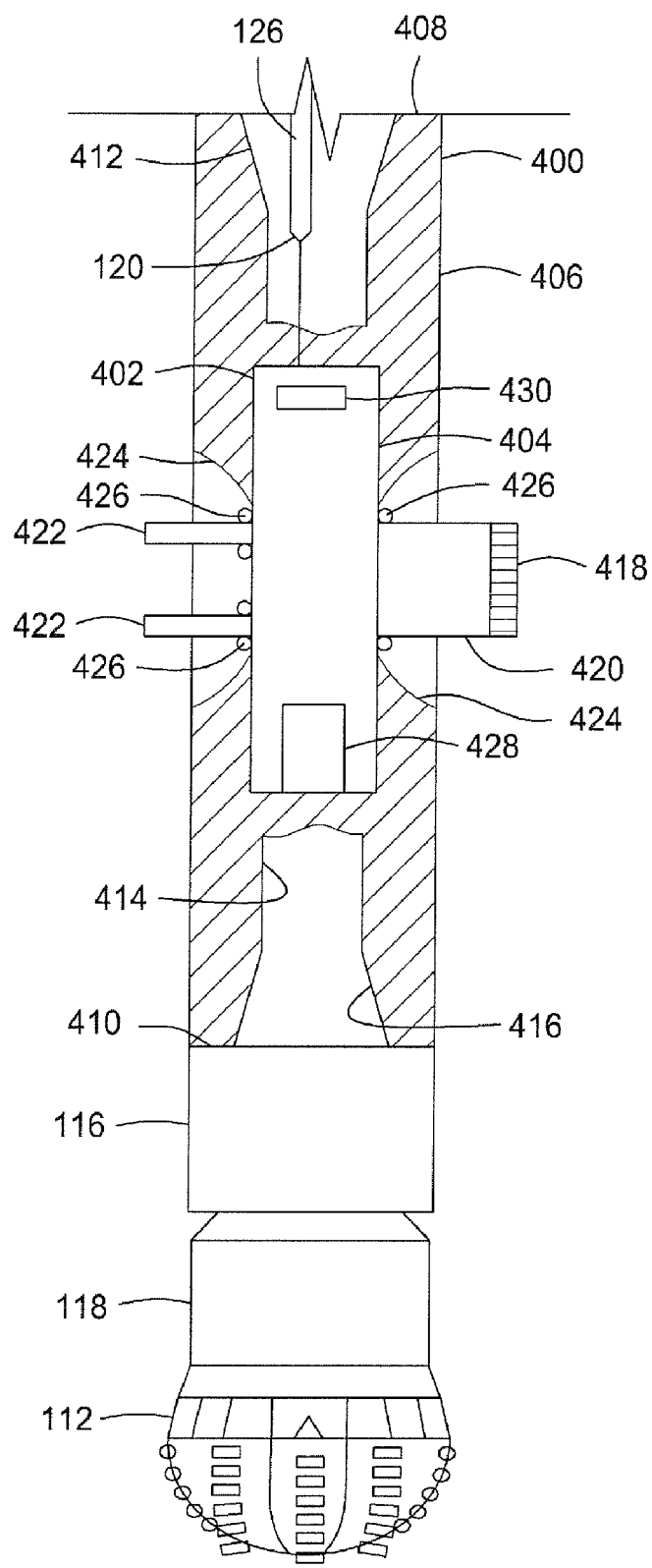
FIG. 4 illustrates a non-limiting example of a downhole sub according to the disclosure that includes a rotary sidewall coring tool.

FIG. 4 illustrates a non-limiting example of a downhole sub 400 according to the disclosure that includes FE tool 402 incorporating a rotary sidewall coring tool 404. The rotary sidewall coring tool 404 in one or more embodiments may be used to collect a core sample from the formation surrounding the borehole. The downhole sub 400 in this non-limiting example includes an elongated section 406 having a first end 408 and a second end 410. The first end 408 includes a coupling 412 suitable for connecting the sub 400 to a drill string 108 as described above and shown in FIG. 1. A fluid passage 414 extends through the downhole sub 400 and is routed to bypass the FE tool 402. The passage 414 may then exit the downhole sub second end 410 at a connection 416 that establishes fluidic communication with a motor 116 and bit 112 substantially as described above and shown in FIG. 1.

In one or more embodiments, the rotary sidewall coring tool 304 may include a cutting element 418 mounted on an extendable bit body 420. Suitable coring tools for the purposes of this disclosure may be substantially as described in U.S. Pat. No. 5,617,927 for "Sidewall Rotary Coring Tool" and in published U.S. patent application Ser. No. 11/215,271 having the publication number US 2007/0045005 A2, which patent and published application are assigned to the assignee of the present application and are incorporated in their entireties herein by reference.

The exemplary coring tool 404 may include back-up feet 422 or a shoe positioned substantially opposite the cutting element 418. A core sample container 428 may be included to contain a core sample for retrieval to the surface. A sample compensator may also be included as described above and shown in FIG. 3 to maintain the core sample and any fluid collected along with the core sample during transport to the surface. In one or more embodiments, a controller 430 may be included with the FE tool 402 to control operation of the coring tool 404. The controller 430 may be electrically coupled to the surface equipment 136 via the slickline 126 and wet connector 120.

The exemplary sub 400 includes a recess 424 into which the cutting element 418 may be retracted during transport in the borehole. O-ring seals 426 may be provided to provide a fluid barrier between internal portions of the tool 402 and the borehole. A similar recess 424 and O-ring seals 426 may be provided for the back-up feet 422 when used.

In one or more non-limiting operational embodiments, the FE tool 402 is conveyed on the downhole sub 400 after a primary drilling system has drilled a borehole through a zone of interest. The drilling motor 116 may be operated to rotate the drill bit 112 when the drill string encounters an obstruction of otherwise poor quality borehole zone.

The positioning devices 118 are operated to position and orient the FE tool 402 at a selected position in the borehole. A slickline 126 is conveyed in the borehole to a side-entry sub 122 at which point the slickline enters the drill string 108 and is pumped down the drill string using surface equipment as discussed above and shown in FIG. 1.

The slickline 126 includes a wet connect connector 120 that engages a corresponding wet connect connector mounted on the downhole sub to establish communication with the FE tool 402 after the FE tool is positioned. The FE tool 402 may then be operated under control by the surface equipment 136 to collect information and/or core samples at the selected downhole location.

Figure 5:
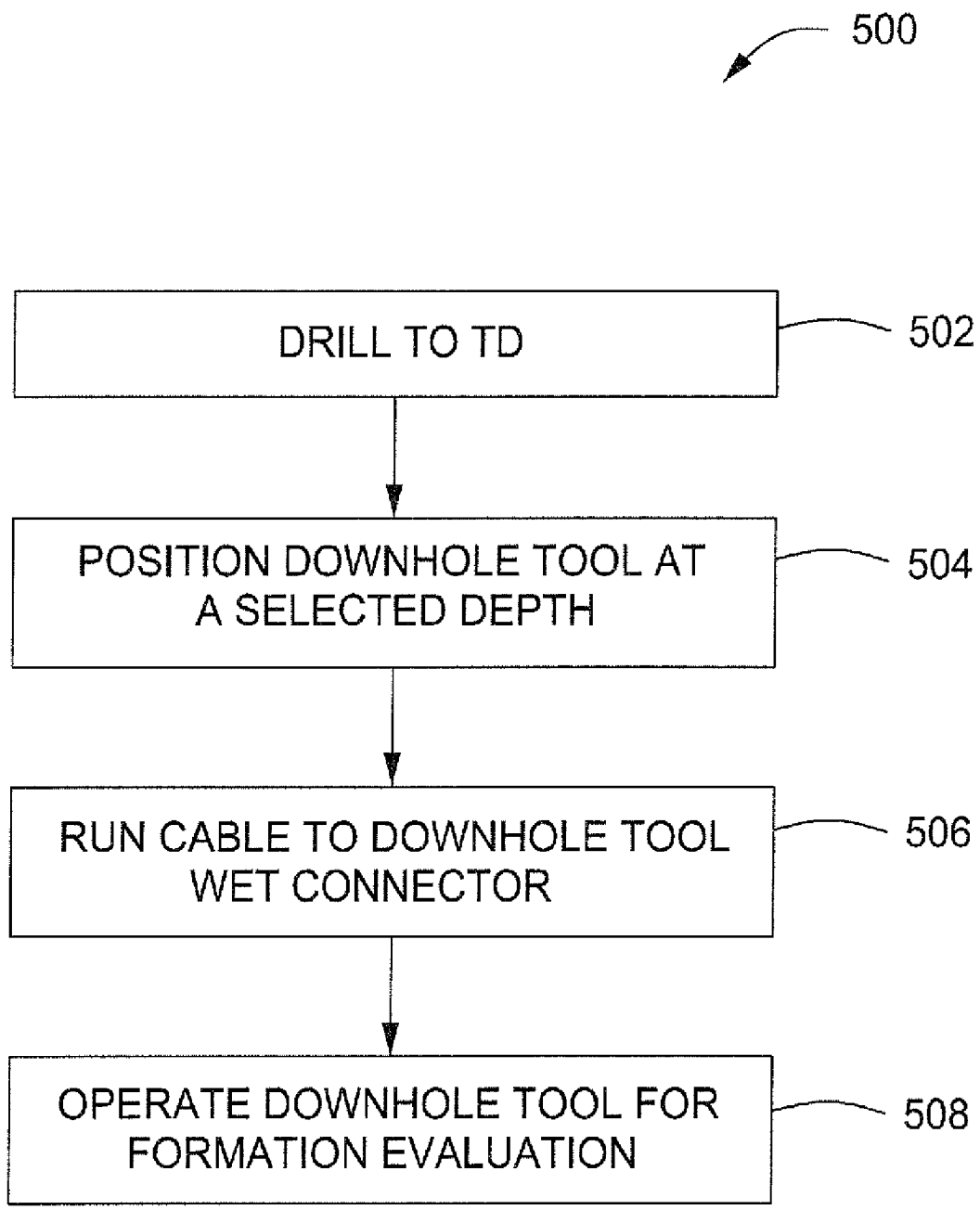
FIG. 5 illustrates one example of a non-limiting method for formation evaluation after drilling according to the disclosure.

FIG. 5 illustrates one example of a non-limiting method 500 for formation evaluation after drilling according to the disclosure. The method 500 includes drilling a borehole to TD 502 using a primary drilling system. A downhole tool may then be positioned at a selected depth 504 by conveying the downhole tool on a drill pipe having a drill bit on an end thereof for cleaning the borehole ahead of the tool. In one or more embodiments, the method may further include conveying or running a cable to the downhole tool and making a communication connection with the tool using a wet connector 506. The downhole tool may then be operated 508 at the selected depth. In one or more embodiments, the tool may be operated and controlled using surface equipment in communication with the tool via the cable. An advantage of running the cable after the tool is that the drill pipe may be used to support the weight of the tool and the cable may better withstand the stress in very deep well applications. Another advantage is that the cable may be pumped through the drill pipe using a surface pumping system and the cable may be run in a well deviated from vertical.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Such insubstantial variations are to be considered within the scope of the claims below.

Given the above disclosure of general concepts and specific embodiments, the scope of protection is defined by the claims appended hereto. The issued claims are not to be taken as limiting Applicant's right to claim disclosed, but not yet literally claimed subject matter by way of one or more further applications including those filed pursuant to the laws of the United States and/or international treaty.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

What is claimed is:

1. A method for evaluating a formation comprising:
    conveying a formation evaluation tool in a borehole on a tubular carrier extending from a surface location to the formation evaluation tool;
    positioning the formation evaluation tool at a selected borehole location;
    wherein a fluid passage extends through a downhole and is routed to bypass the formation evaluation tool and the fluid passage exits the downhole sub second end at a connection that established fluidic communication with a motor and a bit;
    extending a cable from the surface location to the formation evaluation tool at the selected borehole location;
    establishing a connection between the cable and the formation evaluation tool at the selected borehole location; and
    sending an electrical signal from the surface location to the formation evaluation tool over the cable extending from the surface location to the formation evaluation tool to operate the formation evaluation tool in-situ to evaluate the formation.

2. A method according to claim 1, wherein conveying the formation evaluation tool includes conveying one of (i) a measurement tool, (ii) a sampling tool; and (iii) a combination thereof.

3. A method according to claim 1, wherein the tubular carrier includes a drill string.

4. A method according to claim 3, wherein the drill string includes one of (i) a plurality of jointed tubular sections, (ii) a coiled tube, and (iii) a combination thereof.

5. A method according to claim 1, further comprising cleaning a borehole portion ahead of the formation evaluation tool.

6. A method according to claim 5, wherein cleaning the borehole portion ahead of the formation evaluation tool includes rotating a drill bit.

7. A method according to claim 1, wherein conveying the formation evaluation tool includes conveying the formation evaluation tool after the borehole has been drilled to total depth.

8. A method according to claim 1, wherein conveying the formation evaluation tool includes conveying the formation evaluation tool after tripping a primary drill string.

9. A method according to claim 1, wherein conveying the cable to the formation evaluation tool includes pumping the cable through at least a portion of the tubular carrier.

10. A method according to claim 1, wherein establishing the connection includes using a wet connect.

11. A method according to claim 1, further comprising extending the cable from a surface control unit at the surface location to the formation evaluation tool at the selected borehole location and sending the signal from the surface control unit to the formation evaluation tool over the cable.

12. An apparatus for evaluating a formation comprising:
    a formation evaluation tool;
    wherein a fluid passage extends through a downhole and is routed to bypass the formation evaluation tool and the fluid passage exits the downhole sub second end at a connection that established fluidic communication with a motor and a bit;

a tubular carrier extending from a surface location to the formation evaluation tool and coupled to the formation evaluation tool, the tubular carrier configured to position the formation evaluation tool at a selected borehole location;

a cable configured to be extended from a surface location to the formation evaluation tool after the formation evaluation tool is positioned at the selected borehole location; and an interface configured to establish a connection between the cable and the formation evaluation tool at the selected borehole location, wherein a signal is sent from the surface location to the formation evaluation tool over the cable extending from the surface location to the formation evaluation tool to operate the formation evaluation tool in-situ to evaluate the formation.

13. An apparatus according to claim 12, wherein the formation evaluation tool includes one of (i) a measurement tool, (ii) a sampling tool, and (iii) a combination thereof.

14. An apparatus according to claim 12, wherein the formation evaluation tool includes one or more of a ballistic core device, a rotary coring tool, and a fluid sampling tool.

15. An apparatus according to claim 12, wherein the formation evaluation tool includes a fluid analyzer.

16. An apparatus according to claim 12, further comprising a drill bit configured to clean a borehole portion ahead of the formation evaluation tool.

17. An apparatus according to claim 16, further comprising a motor disposed on the tubular carrier configured to rotate the drill bit.

18. An apparatus according to claim 12, further comprising a side entry sub configured to accept the cable, the cable being conveyed in the tubular carrier below the side entry sub.

19. An apparatus according to claim 12, further comprising a surface controller at the surface location, wherein the cable extends from the surface controller to the formation evaluation tool at the selected borehole location and the signal is sent from the surface controller to the formation evaluation tool over the cable.

20. An apparatus according to claim 19, wherein at least a portion of the controller is located at a surface location, the controller being in communication with the formation evaluation tool via the interface.

* * * * *